(12) United States Patent
Park et al.

(10) Patent No.: US 11,651,464 B2
(45) Date of Patent: May 16, 2023

(54) APPARATUS FOR PROVIDING CAR SHARING SERVICE AND METHOD THEREOF

(71) Applicants: HYUNDAI MOTOR COMPANY, Seoul (KR); KIA MOTORS CORPORATION, Seoul (KR)

(72) Inventors: Jung Mi Park, Anyang-si (KR); Yarygina Anastasia, Seoul (KR); Jimin Han, Anyang-si (KR); Jia Lee, Uiwang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 604 days.

(21) Appl. No.: 16/109,398

(22) Filed: Aug. 22, 2018

(65) Prior Publication Data

US 2019/0180404 A1 Jun. 13, 2019

(30) Foreign Application Priority Data

Dec. 13, 2017 (KR) .................. 10-2017-0171162

(51) Int. Cl.
*G06Q 50/30* (2012.01)
*G01C 21/34* (2006.01)
(Continued)

(52) U.S. Cl.
CPC ............ *G06Q 50/30* (2013.01); *G01C 21/20* (2013.01); *G01C 21/3438* (2013.01); *G01C 21/3484* (2013.01); *G01C 21/3691* (2013.01)

(58) Field of Classification Search
CPC .... G06Q 50/30; G01C 21/20; G01C 21/3438; G01C 21/3484; G01C 21/3691
See application file for complete search history.

(56) References Cited

U.S. PATENT DOCUMENTS 6,356,838 B1 3/2002 Paul
8,949,028 B1 2/2015 Klampfl et al.
(Continued)

FOREIGN PATENT DOCUMENTS

JP 2002-342873 A 11/2002
JP 2015-191364 A 11/2015
(Continued)

OTHER PUBLICATIONS

J. Lin, S. Sasidharan, S. Ma and O. Wolfson, "A Model of Multimodal Ridesharing and Its Analysis," 2016 17th IEEE International Conference on Mobile Data Management (MDM), 2016, pp. 164-173, doi: 10.1109/MDM.2016.34. (Year: 2016).*
(Continued)

*Primary Examiner* — Jeff Zimmerman
*Assistant Examiner* — Wayne S. Murray
(74) *Attorney, Agent, or Firm* — Morgan, Lewis & Bockius LLP

(57) ABSTRACT

An apparatus for providing a car sharing service includes a processor configured to: extract at least one car-sharing station candidate between a departure point and a destination point; generate at least one route that combines and provides a car-hailing service and a car-sharing service from the departure point to the destination point; determine a priority of the at least one route using at least one of a number of cars providing the car-hailing service, a car-hailing success probability, a state whether traffic is congested around the car-sharing station candidate, a state whether it is possible to return the car, a distance from the car-sharing station candidate to the destination point, a distance from the departure point to the car-sharing station candidate, a fare by the route, a driving distance, an estimate driving time, or an estimate waiting time; and provide the determined priority to a user terminal.

20 Claims, 10 Drawing Sheets

(51) Int. Cl.
    *G01C 21/20*        (2006.01)
    *G01C 21/36*        (2006.01)

(56)            References Cited

U.S. PATENT DOCUMENTS

| | | |
|---|---|---|
| 2009/0292461 A1 | 11/2009 | Mastie et al. |
| 2011/0313880 A1 | 12/2011 | Paul et al. |
| 2015/0278712 A1 | 10/2015 | Fujita et al. |
| 2016/0298977 A1* | 10/2016 | Newlin .............. G01C 21/3679 |
| 2017/0052034 A1* | 2/2017 | Magazinik ........... G06Q 10/047 |
| 2017/0169535 A1* | 6/2017 | Tolkin .................... G06Q 50/30 |
| 2017/0357914 A1* | 12/2017 | Tulabandhula ....... H04W 4/025 |
| 2018/0091604 A1* | 3/2018 | Yamashita .............. H04L 67/51 |
| 2018/0356239 A1* | 12/2018 | Marco ................ G01C 21/3611 |
| 2018/0374032 A1* | 12/2018 | Pan .................... G01C 21/3438 |

FOREIGN PATENT DOCUMENTS

| | | |
|---|---|---|
| KR | 10-2005-0039377 A | 4/2005 |
| KR | 10-2013-0040430 A | 4/2013 |
| KR | 10-2015-0090969 A | 8/2015 |

OTHER PUBLICATIONS

Notice of Allowance issued in corresponding Korean Patent Application No. 10-2017-0171162 dated Mar. 22, 2023, with English translation.

* cited by examiner

APPARATUS FOR PROVIDING CAR SHARING SERVICE AND METHOD THEREOF

CROSS-REFERENCE TO RELATED APPLICATION

This application is based on and claims the benefit of priority to Korean Patent Application No. 10-2017-0171162, filed on Dec. 13, 2017, in the Korean Intellectual Property Office, the disclosure of which is incorporated herein in its entirety by reference.

TECHNICAL FIELD

The present disclosure relates to an apparatus for providing a car sharing service and a method thereof, and more particularly, to a technique capable of providing a car sharing and hailing service between a plurality of users and a plurality of drivers.

BACKGROUND

A car-hailing or ride-hailing service, which connects a user who wants to move and a service provider who provides a transportation service in real time, and a car-sharing service, which supports users having similar points of departure and destination to share a vehicle to reduce costs, have been increasing.

In case of the car-hailing service, the users at different points of departure are not capable of using the car-hailing service on the same car at the same time. Thus, the users have to hail different cars from each other and pay the costs accordingly. In addition, when the vehicle driving distance and driving time is long, the cost of the car-hailing service increases, thereby increasing the user's burden on the cost.

In using the car-sharing service, the users having similar departure and destination points gather together in a predetermined car stand for the car-sharing service, and thus, there is an inconvenience that the user has to go to a nearby car stand by herself/himself. Further, when the car stand for the car-sharing service is located far from the user's present location, it is difficult for the user to use the car-sharing service.

SUMMARY

The present disclosure has been made to solve the above-mentioned problems occurring in the prior art while advantages achieved by the prior art are maintained intact.

An aspect of the present disclosure provides an apparatus for providing a car sharing service and a method thereof, which are capable of minimizing user's waiting time, travel time, and cost and a driver's profit by providing a route obtained by easily combining a car-hailing service and a car-sharing service in a case that it is difficult to solely use the car hailing service or a car sharing station is too far to walk.

The technical problems to be solved by the present inventive concept are not limited to the aforementioned problems, and any other technical problems not mentioned herein will be clearly understood from the following description by those skilled in the art to which the present disclosure pertains.

According to an exemplary embodiment of the present disclosure, an apparatus for providing a car sharing service includes: a processor that extracts at least one car-sharing station candidate between a departure point and a destination point, generates at least one route that combines and provides a car-hailing service and a car-sharing service from the departure point to the destination point via the at least one car-sharing station candidate, determines a priority of the at least one route using at least one of a number of cars providing the car-hailing service, a car-hailing success probability, a state whether traffic is congested around the car-sharing station candidate, a state whether it is possible to return the car, a distance from the car-sharing station candidate to the destination point, a distance from the departure point to the car-sharing station candidate, a fare by the route, a driving distance, an estimate driving time, or an estimate waiting time, and provides the determined priority to a user terminal; and a storage that stores the generated route, information about a car-sharing station, information about the fare by the route, and information about a location of the user terminal.

The processor further extracts the car-sharing station candidate for providing the car-sharing service to a portion of the route between the departure point and the destination point, compares the car-sharing station candidates with each other using at least one of the number of cars providing the car-hailing service within a certain distance from the car-sharing station candidate, the car-hailing success probability, the state whether the traffic is congested around the car-sharing station candidate, the state whether it is possible to return the car in the car-sharing station candidate, the distance from the car-sharing station candidate to the destination point, or the distance from the car-sharing station, which exists within the certain distance from the departure point, to the car-sharing station candidate and selects at least one car-sharing station candidate among the car-sharing station candidates, generates at least one route among a car-sharing service sole route, a car-hailing service sole route, and a combination route of the car-sharing service and the car-hailing service from the departure point to the destination point via the selected at least one car-sharing station candidate, and determines the priority using at least one of the fare by the route, the driving distance, the estimated driving time, the estimated waiting time, and the compared information between the car-sharing station candidates.

The processor combines and provides the car-hailing service and the car-sharing service when the car-hailing service is solely used from the departure point to the destination point and the fare is equal to or greater than a reference value.

The processor determines whether the car-sharing station exists within a walkable distance from the departure point and whether the car-sharing station exists within a walkable distance from the destination point.

In a case that the car-sharing station exists within the walkable distance from the departure point and the car-sharing station does not exist within the walkable distance from the destination point, the processor provides the car-sharing service from the departure point to the car-sharing station existing within the walkable distance from the departure point and provides the car-hailing service from the car-sharing station to the car-sharing station existing within the walkable distance from the destination point.

In a case that the car-sharing station does not exist within the walkable distance from the departure point and the car-sharing station exists within the walkable distance from the destination point, the processor determines whether a car-sharing station for alighting exists in the route between the departure point and the destination point, and in a case that the car-sharing station for alighting exists, the processor provides the car-hailing service from the departure point to the car-sharing station for alighting and provides the car-sharing service from the car-sharing station for alighting to the car-sharing station existing within the walkable distance from the destination point.

The car-sharing station for alighting in the route between the departure point and the destination point includes a car-sharing station which is not within the walkable distance from the departure point but within a short travel distance by car and a car-sharing station which is not within the walkable distance from the destination point but within the short travel distance by car.

In a case that the car-sharing station does not exist within the walkable distance from the departure point and the car-sharing station does not exist within the walkable distance from the destination point, the processor extracts at least one car-sharing station near the departure point in the route between the departure point and the destination point and at least one car-sharing station near the destination point in the route between the departure point and the destination point, provides the car-hailing service from the departure point to the at least one car-sharing station near the departure point, provides the car-sharing service from the at least one car-sharing station near the departure point to the at least one car-sharing station near the destination point, and provides the car-hailing service from the at least one car-sharing station near the destination point to the destination point.

The processor further extracts the departure point corresponding to a location of the user terminal, extracts a location of the car providing the car-hailing service around the departure point, sets the fare on each route, and performs an authentication operation when the user terminal logs in for requesting the car snaring service.

The apparatus for providing the car sharing service further includes, when one route of the at least one route, which is generated by a number of the at least one car-sharing station, traveling from the departure point to the destination point via the at least one car-sharing station candidate is selected by the user terminal, a communication device that performs a communication between a driver terminal providing the car-sharing service of the selected route, a driver terminal providing the car-hailing service, and the user terminal requesting the car sharing service.

According to another exemplary embodiment of the present disclosure, an apparatus for providing a car sharing service includes a processor that extracts at least one or more car-sharing station candidates in a route between a departure point and a destination point when a user uses a car-sharing service in the departure point, compares the car-sharing station candidates with each other using at least one of a number of cars providing a car-hailing service within a certain distance from the car-sharing station candidates, a car-hailing success probability, a state whether the traffic is congested around the car-sharing station candidate, a state whether it is possible to return a car, a distance from the car-sharing station candidate to the destination point, or a distance from the departure point to the car-sharing station candidate, generates at least one route providing the car-sharing service from the departure point to the at least one car-sharing station and at least one route providing the car-hailing service from the at least one car-sharing station candidate to the destination point, and determines a priority using at least one of a fare on each route, a driving distance, an estimated driving time, an estimated waiting time, and the compared information between the car-sharing station candidates.

The processor further determines whether the fare exceeds a reference value when the car-hailing service is solely used and determines whether the car-hailing service is to be combined with the car-sharing service depending on the determined result.

In a case that the processor determines that the fare exceeds the reference value when the car-hailing service is solely used, the car-sharing station extractor extracts the car-sharing station.

The processor determines whether the car-sharing station exists within a walkable distance from the departure point and whether the car-sharing station exists within a walkable distance from the destination point.

In a case that the processor determines that the car-sharing station exists within the walkable distance from the departure point and the car-sharing station does not exist within the walkable distance from the destination point, the processor determines whether a car-sharing station exists near the destination point, and the route generator generates a route for providing the car-sharing service from the car-sharing station existing within the walkable distance from the departure point to the car-sharing station near the destination point and generates a route for providing the car-hailing service from the car-sharing station near the destination point to the destination point.

According to another exemplary embodiment of the present disclosure, an apparatus for providing a car sharing service includes a processor that extracts one or more car-sharing station candidates in a route between a departure point and a destination point when a user departs from the departure point using a car-sharing service, compares the car-sharing station candidates with each other using at least one of a state whether the traffic is congested around the car-sharing station candidate, a state whether it is possible to return a car in the car-sharing station candidate, a distance from the car-sharing station candidate to the destination point, or a distance from the departure point to the car-sharing station candidate, generates at least one route for providing the car-hailing service from the departure point to at least one or more car-sharing station candidates and at least one route for providing the car-sharing service from at least one or more car-sharing station candidates to the destination point, and determines a priority using at least one of a fare on each route, a driving distance, an estimated driving time, an estimated waiting time, and the compared information between the car-sharing station candidates.

The processor further determines whether the fare exceeds a reference value when the car-hailing service is solely used and determines whether the car-hailing service is to be combined with the car-sharing service depending on the determined result.

In a case that the processor determines that the fare exceeds the reference value when the car-hailing service is solely used, the car-sharing station extractor extracts the car-sharing station.

The processor determines whether the car-sharing station exists within a walkable distance from the departure point and whether the car-sharing station exists within a walkable distance from the destination point.

In a case that the processor determines that the car-sharing station does not exist within the walkable distance from the departure point and the car-sharing station exists within the walkable distance from the destination point, the processor determines whether a car-sharing station candidate for boarding exists between the departure point and the destination point, and when the car-sharing station candidate near the departure point exists between the departure point and the destination point, the route generator generates a route for providing the car-hailing service from the departure point to the car-sharing station candidate near the departure point and generates a route for providing the car-sharing service from the car-sharing station candidate near the departure point to the car-sharing station within the walkable distance from the destination point.

According to another exemplary embodiment of the present disclosure, an apparatus for providing a car sharing service includes a processor that extracts a first car-sharing station candidate group for providing a car-sharing service between a departure point and a destination point and a second car-sharing station candidate group for providing a car-hailing service between the first car-sharing station candidate group and the destination point, compares car-sharing station candidates of the first car-sharing station candidate group with each other and car-sharing station candidates of the second car-sharing station candidate group with each other using at least one of a number of cars providing the car-hailing service around the car-sharing station candidate, a car-hailing success probability, a state whether traffic is congested around the car-sharing station candidate, a state whether it is possible to return the car, a distance from the car-sharing station candidate to the destination point, or a distance from the departure point to the car-sharing station candidate, generates a route for providing the car-hailing service from the departure point to at least one car-sharing station candidate extracted from the first car-sharing station candidate group, a route for providing the car-sharing service from the at least one car-sharing station candidate extracted from the first car-sharing station candidate group to at least one car-sharing station candidate extracted from the second car-sharing station candidate group, and a route for providing the car-hailing service from the at least one car-sharing station candidate extracted from the second car-sharing station candidate group to the destination point, and determines a priority using at least one of a fare on each route, a driving distance, an estimated driving time, an estimated waiting time, and the compared information between the car-sharing station candidates.

The car-sharing station candidate comparator compares the car-sharing station candidates of the first car-sharing station candidate group with each other using at least one of the state whether the traffic is congested around the car-sharing station candidate, the state whether it is possible to return the car, the distance from the car-sharing station candidate to the destination point, or the distance from the departure point to the car-sharing station candidate and compares the car-sharing station candidates of the second car-sharing station candidate group with each other using at least one of the number of cars providing the car-hailing service around the car-sharing station candidate, the car-hailing success probability, the state whether the traffic is congested around the car-sharing station candidate, the state whether it is possible to return the car, the distance from the car-sharing station candidate to the destination point, or the distance from the departure point to the car-sharing station candidate.

The processor determines whether the fare exceeds a reference value when the car-hailing service is solely used and determines whether the car-hailing service is to be combined with the car-sharing service depending on the determined result.

In a case that the processor determines that the fare exceeds the reference value when the car-hailing service is solely used, the car-sharing station extractor extracts the car-sharing station.

The processor determines whether the car-sharing station exists within a walkable distance from the departure point and whether the car-sharing station exists within a walkable distance from the destination point.

In a case that the processor determines that the car-sharing station does not exist within the walkable distance from the departure point and the car-sharing station does not exist within the walkable distance from the destination point, the processor determines whether a car-sharing station near the departure point and a car-sharing station near the destination point exist between the departure point and the destination point.

According to another exemplary embodiment of the present disclosure, a method for providing a car sharing service includes: extracting, by a processor, car-sharing stations existing within a walkable distance from a departure point, within a walkable distance from a destination point, and between the departure point and the destination point; and generating, by the processor, at least one route by a number of the car-sharing stations existing between the departure point and the destination point, the at least one route comprising a route for providing a car-sharing service or a route obtained by combining a car-hailing service with the car-sharing service from the departure point to the destination point depending on whether the car-sharing stations exist within the walkable distance from the departure point and the destination point.

The method further includes determining a priority of the at least one route and sharing, when one route of the at least one route is selected by a user terminal, information about the selected route with a driver terminal providing the car-hailing service or the car-sharing service.

In a case that the car-sharing station exists within the walkable distance from the departure point and the car-sharing station does not exist within the walkable distance from the destination point, the generating of the route includes generating a route moving to each location of at least one or more car-sharing station candidates from the departure point using the car-sharing service and generating each route reaching the destination point from each location of at least one or more car-hailing station candidates using the car-hailing service.

In a case that the car-sharing station does not exist within the walkable distance from the departure point and the car-sharing station exists within the walkable distance from the destination point, the generating of the route includes generating a route moving to the location of the car-sharing station candidate from the departure point using the car-hailing service and generating each route reaching the destination point from each location of at least one or more car-sharing station candidates using the car-hailing service.

In a case that the car-sharing station does not exist within the walkable distance from the departure point and the car-sharing station does not exist within the walkable distance from the destination point, the generating of the route includes generating a route moving to a location of a first waypoint candidate from the departure point using the car-hailing service, generating a route moving to a location of a second waypoint candidate from the location of the first waypoint candidate using the car-sharing service, and generating a route reaching the destination point from the location of the second waypoint candidate using the car-hailing service.

According to the above, in the case that it is difficult to solely use the car-hailing service or the car-sharing station is too far to walk, the route obtained by easily combining the car-hailing service and the car-sharing service is provided.

Thus, the waiting time of the user, the traveling time, and the cost are minimized, and the profit of the driver is maximized, thereby enhancing convenience of the user and the driver.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
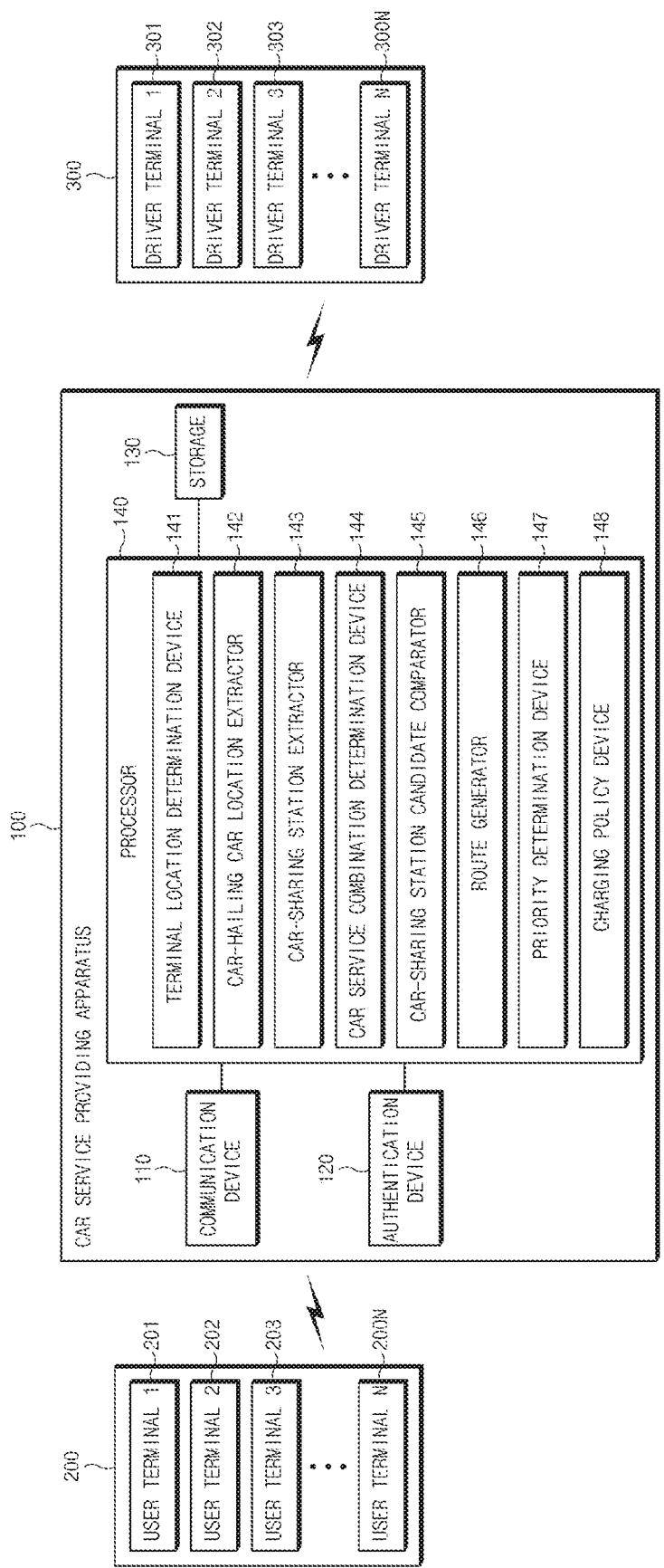
FIG. 1 is a block diagram illustrating an apparatus for providing a car sharing service according to an exemplary embodiment of the present disclosure.

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

In the present disclosure, a car-hailing service is a car-hailing or ride-hailing service and is implemented to enable a user who hails a car to be picked up and driven to his/her destination point by a driver and the user pays the car-hailing fare to the driver. A car-sharing service includes a car-sharing or carpooling service and is implemented to enable a plurality of users having similar departure and destination points to share a car for a ride and the users pay the driver low fares.

In the present disclosure, a technique capable of combining and providing the car-hailing service and the car-sharing service that may optimize fare and time will be disclosed.

Hereinafter, exemplary embodiments of the present disclosure will be described in detail with reference to FIGS. 1 to 10.

FIG. 1 is a block diagram illustrating an apparatus for providing a car service according to an exemplary embodiment of the present disclosure.

Referring to FIG. 1, the car service providing apparatus 100 according to the exemplary embodiment of the present disclosure may provide the car-hailing service and the car-sharing service between a user terminal group 200 and a driver terminal group 300.

A plurality of user terminals 201, 202, ..., and 200N is a terminal used by the user who wants to travel to the destination point using the car-hailing service or the car-sharing service, and a plurality of driver terminals 301, 302, ..., and 300N is a terminal used by the driver who drives a car to move to a location where the user is or to a car sharing station and takes the user to the destination point when the car-hailing or car-sharing request is received.

The user terminals 201, 202, ..., and 200N and the driver terminals 301, 302, and 300N may include all portable communication terminals, such as a smart phone, a pad, a PDA, etc.

In addition, the user terminals 201, 202, ..., and 200N and the driver terminals 301, 302, ..., and 300N may receive the car service by installing an application for the car service including the car-hailing service, the car-sharing service, and a car-hailing-sharing combination service and executing the application.

The car service providing apparatus 100 includes a communication device 110, an authentication device 120, a storage 130, and a processor 140.

In an exemplary embodiment of the present disclosure, the communication device 110 and the authentication device 120 may be hardware devices and may be connected as separate devices or embedded in the processor 140. In addition, the various embodiments disclosed herein, including embodiments of the car service providing apparatus 100 and/or elements thereof, can be implemented using one or more processors coupled to a memory (or other non-transitory machine readable recording medium) storing computer-executable instructions for causing the processor(s) to perform the functions described above including the functions described in relation to the communication device 110 and the authentication device 120.

The communication device 110 performs a communication with the user terminals 201, 202, ..., and 200N, and the driver terminals 301, 302, ..., and 300N. The communication device 110 is a hardware device capable of transmitting an analog or digital signal over wire or wirelessly and may include one or more components that enable communication with an external device. Examples of the communication device 110 include Bluetooth devices, infrared devices, modem, network card (using Ethernet), smartphone, Wi-Fi devices (using a Wi-Fi router), etc. Here, the communication device 110 may include a communication module that supports a communication interface with electrical equipment. The communication module may include a short-range communication module, wired communication module, wireless communication module, and the like, and may receive information detected by the sensors in the ego vehicle 10 and receive status information of the ego vehicle 10. In addition, the communication module may include a control circuit such as an integrated circuit (IC) chip.

The communication module may include a module supporting a vehicle network communication, such as a controller area network (CAN) communication, a local interconnect network (LIN) communication, a Flex-ray communication, etc.

The communication module may include a module for a wireless internet access or a module for a short range communication. As a wireless internet technology, a wireless LAN (WLAN), a wireless broadband (Wibro), a Wi-Fi, a world interoperability for microwave access (Wimax), and the like may be used, and a Bluetooth, a ZigBee, an ultra-wideband (UWB), a radio frequency identification (RFID), an infrared data association (IrDA), and the like may be used as a short range communication technology.

When the user terminals 201, 202, . . . , and 200N and the driver terminals 301, 302, . . . , and 300N log in the car service providing apparatus 100, the authentication device 120 performs an authentication operation based on previously-stored authentication information and permits the login.

The storage 130 stores location information about the user terminals 201, 202, . . . , and 200N and the driver terminals 301, 302, . . . , and 300N, which are registered as members, map information for route generation, traffic information, route information for destination, user authentication information, route information, car-sharing station information, charging policy information about the car-sharing service or the car-hailing service, and the like. In the present embodiment, the storage 130 may include a storage medium as a physical material that holds information, such as a random access memory (RAM), a static random access memory (SRAM), a read-only memory (ROM), a programmable read-only memory (PROM), an electrically erasable programmable read-only memory (EEPROM), etc.

The processor 140 extracts the car-sharing station existing between a departure point and a destination point depending on whether the car-sharing station exists within a certain distance from the departure point or from the destination point, combines the car-hailing service and the car-sharing service to generate routes from the departure point to the destination point via the car-sharing station, and determines a priority of the routes to provide the routes to the user terminal. Then, the processor 140 shares selection route information from the user terminal with a selected driver terminal to establish a contract of the car service.

To this end, the processor 140 includes a terminal location determination device 141, a car-hailing car location extractor 142, a car-sharing station extractor 143, a car service combination determination device 144, a car-sharing station candidate comparator 145, a route generator 146, a priority determination device 147, and a charging policy device 148. In the present disclosure, a processor or processing unit is an electronic circuit, which performs operations on some external data source, usually memory or some other data stream.

The term "processor" is also known as a central processor or central processing unit (CPU), which is the electronic circuitry within a computer that carries out the instructions of a computer program by performing the basic arithmetic, logical, control and input/output (I/O) operations specified by the instruction.

The terminal location determination device 141 determines a present location of the user terminals 201, 202, . . . , and 200N and the driver terminals 301, 302, . . . , and 300N. In this case, when the user terminals 201, 202, . . . , and 200N and the driver terminals 301, 302, . . . , and 300N execute the application for the car service, the terminal location determination device 141 may collect the location of a corresponding terminal through a communication or receive the departure point from the user and the driver to locate the location of the corresponding terminal.

The car-hailing car location extractor 142 extracts a location of the car-hailing car located around the departure point, the destination point, and the car-sharing station to provide the extracted location of the car-hailing car to the car service combination determination device 144.

The car-sharing station extractor 143 extracts the car-sharing station around the departure point or the destination point to provide the car-sharing service. In this case, the car-sharing station within the certain distance from the departure point may indicate a car-sharing station in a short walking distance from the departure point, the car-sharing station within the certain distance from the destination point may indicate a car-sharing station in a short walking distance from the destination point, and the car-sharing station between the departure point and the destination point may indicate a car-sharing station physically located on a map between the departure point and the destination point and may indicate all car-sharing stations from the departure point to the destination point even though the car-sharing station is not physically located between the departure point and the destination point.

The car service combination determination device 144 determines whether the car-sharing service is combined with the car-hailing service and generates a route when the car-sharing service and the car-hailing service need to be combined with each other to provide the generated route. The car service combination determination device 144 determines whether a fare for the car-hailing service solely used from the departure point and the destination point exceeds a reference value and determines whether the car-sharing service and the car-hailing service need to be combined with each other. That is, when the fare for the car-hailing service solely used from the departure point to the destination point exceeds the reference value, the car service combination determination device 144 determines that the car-sharing service and the car-hailing service need to be combined with each other.

When the fare for the car-hailing service solely used from the departure point to the destination point exceeds the predetermined reference value, the car service combination determination device 144 controls the car-sharing station extractor 143 to extract the car-sharing station within the certain distance from the departure point. That is, when the fare for the car-hailing service solely used from the departure point to the destination point exceeds the predetermined reference value, the car service combination determination device 144 determines whether the car-sharing station exists within the certain distance from the departure point and the car-sharing station exists within the certain distance (that is, a walkable distance) from the destination point through the car-sharing station extractor 143 and extracts car-sharing station candidates existing between the departure point and the destination point. In a case that the car-sharing station within the certain distance from the departure point and the car-sharing station within the certain distance (that is, a walkable distance) from the destination point do not exist, the car service combination determination device 144 extracts at least one car-sharing station (a first waypoint) adjacent to the departure point (which is not within a walkable distance but within a short travel distance by car) and at least one car-sharing station (a second waypoint) adjacent to the destination point (which is not within a walkable distance but within a short travel distance by car) in the route between the departure point and the destination point through the car-sharing station extractor 143.

When the car service combination determination device 144 determines that the car-sharing station within the walkable distance from the departure point exists and the car-sharing station within the walkable distance from the destination point does not exist, the car service combination determination device 144 determines whether the car-sharing station adjacent to the destination point exists. Then, the route generator 146 generates a route between the car-sharing station within the walkable distance from the departure point and the car-sharing station adjacent to the destination point to provide the car-sharing service and generates a route from the car-sharing station adjacent to the destination point to the destination point to provide the car-hailing service. When the car service combination determination device 144 determines that the car-sharing station within the walkable distance from the departure point does not exist and the car-sharing station within the walkable distance from the destination point exists, the car service combination determination device 144 determines whether the car-sharing station candidate, where a user gets out of the car and which is adjacent to the departure point, exists in the route between the departure point and the destination point.

When the car-sharing station candidate adjacent to the departure point exists in the route between the departure point and the destination point, the route generator 146 may generate a route to provide the car-hailing service from the departure point to the car-sharing station candidate adjacent to the departure point and may generate a route to provide the car-sharing service from the car-sharing station candidate adjacent to the departure point to the car-sharing station within the walkable distance from the destination point.

When the car service combination determination device 144 determines that the car-sharing station within the walkable distance from the departure point does not exist and the car-sharing station within the walkable distance from the destination point does not exist, the car service combination determination device 144 determines whether the car-sharing station adjacent to the departure point and the car-sharing station adjacent to the destination point exist in the route between the departure point and the destination point.

The car-sharing station candidate comparator 145 compares the car-sharing station candidates with each other using at least one of the number of cars providing the car-hailing service within the certain distance from the car-sharing station candidates, a car-hailing service success probability, a state whether a traffic is congested around the car-sharing station, a state whether it is possible to return the car in the car-sharing station candidates, a distance from the car-sharing station candidates to the destination point, or a distance from the car-sharing station, which exists within the certain distance from the departure point, to the car-sharing station candidate. That is, comparison information, such as a case that there are many cars, which provide the car-hailing service, around the car-sharing station candidates, a case that there is no traffic congestion around the car-sharing station candidates, the distance from the departure point to the car-sharing station candidate, a case that the distance from the car-sharing station candidate to the destination point is short, etc., may have priorities, and the car-sharing station candidate comparator 145 may provide the comparison information to the priority determination device 147. In this case, the car-hailing service success probability may be determined based on history and statistical information of previously-provided car-hailing service.

When it is determined that the car-sharing station exists within the certain distance from the departure point and the car-sharing station does not exist within the certain distance from the destination point by the car service combination determination device 144, the route generator 146 generates a route moving from the departure point to the location of the car-sharing station candidate using the car-sharing service and a route moving from each location of the car-sharing station candidate to the destination point using the car-hailing service.

When it is determined that the car-sharing station does not exist within the certain distance from the departure point and the car-sharing station exists within the certain distance from the destination point by the car service combination determination device 144, the route generator 146 generates a route moving from the departure point to the location of the car-sharing station candidate using the car-hailing service and a route moving from each location of the car-sharing station candidate to the destination point using the car-sharing service.

When it is determined that the car-sharing station does not exist within the certain distance from the departure point and the car-sharing station does not exist within the certain distance from the destination point by the car service combination determination device 144, the route generator 146 generates a route moving from the departure point to a location of a first waypoint candidate using the car-hailing service, a route moving from the location of the first waypoint candidate to a location of a second waypoint candidate using the car-sharing service, and a route moving from the location of the second waypoint candidate to the destination point using the car-hailing service.

The charging policy device 148 sets the fare on each route generated by the route generator 146. In this case, the fare may be set depending on a distance to which the car-hailing service is applied, a distance and a time to which the car-sharing service is applied, an increase of fuel consumption, the number of passengers, a distance from the destination point to each waypoint, a distance from the departure point to each waypoint, an additional time, and the like. In addition, the charging policy device 148 calculates the fare for the car-hailing service solely used from the departure point to the destination point and provides the car-sharing station extractor 143 with the fare calculated when the car-hailing service is solely used.

The priority determination device 147 may determine the priority using at least one of the fare on each route generated by the route generator 146, an estimated driving time, or an estimated waiting time. In addition, the priority determination device 147 may determine the priority by taking into account the information about each of the car-sharing stations (waypoints) compared by the car-sharing station candidate comparator 145. In a case that one route is selected by the user terminal among the routes depending on the priority, the processor 140 shares the route of the car-hailing service, the car-sharing service, or the combination of the car-hailing service and the car-sharing service with the driver terminal to establish the contract.

The various embodiments disclosed herein, including embodiments of the car service providing apparatus 100 and/or elements thereof, can be implemented using one or more processors coupled to a memory (or other non-transitory machine readable recording medium) storing computer-executable instructions for causing the processor(s) to perform the functions described above including the functions described in relation to the terminal location determination device 141, the car-hailing car location extractor 142, the car-sharing station extractor 143, the car service combination determination device 144, the car-sharing station candidate comparator 145, the route generator 146, the priority determination device 147, and the charging policy device 148. In addition, the terminal location determination device 141, the car-hailing car location extractor 142, the car-sharing station extractor 143, the car service combination determination device 144, the car-sharing station candidate comparator 145, the route generator 146, the priority determination device 147, and the charging policy device 148 may be connected as separate devices or embedded in the processor 140.

Figure 2:
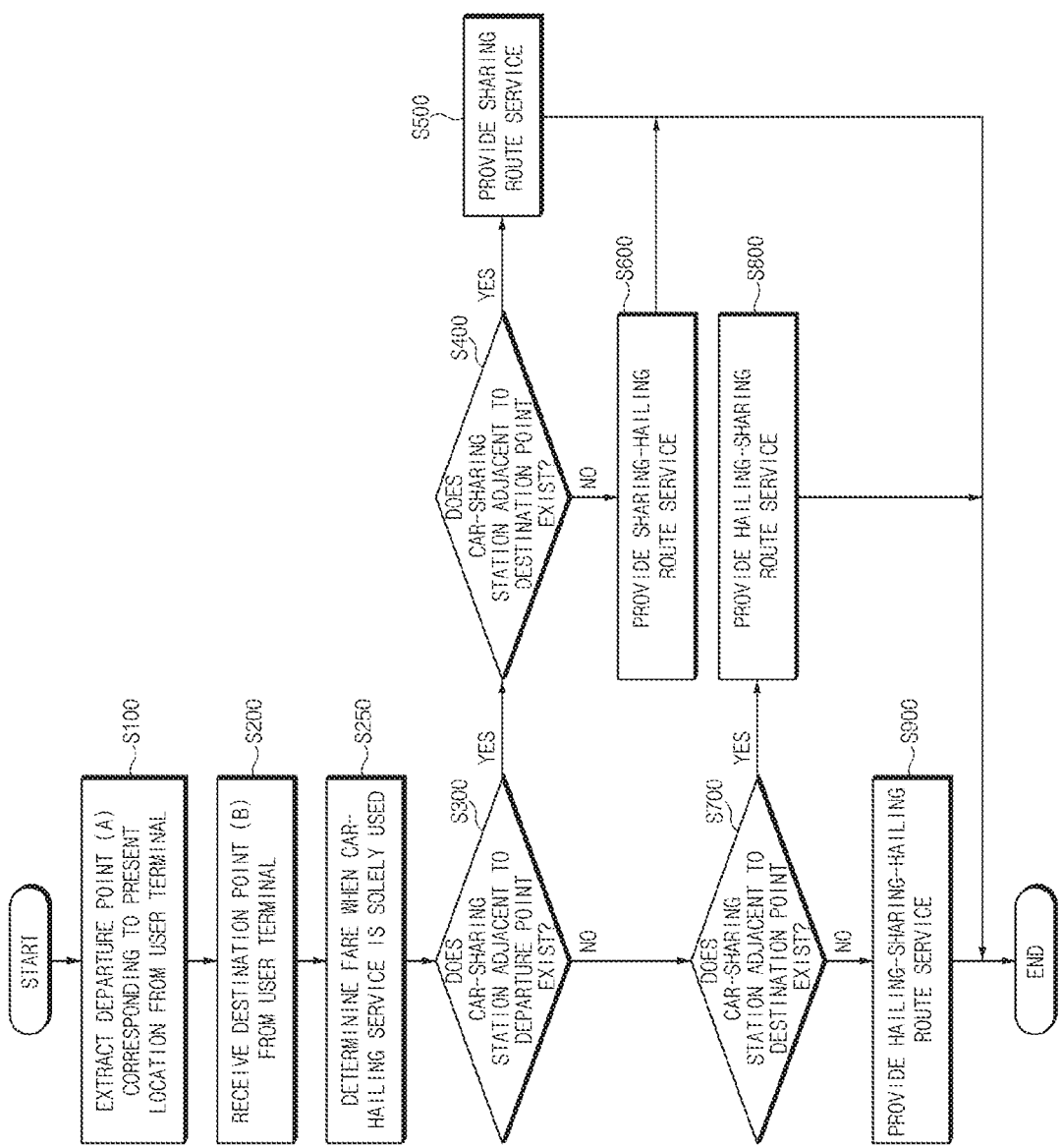
FIG. 2 is a flowchart illustrating a method for providing a car sharing service according to an exemplary embodiment of the present disclosure.

Hereinafter, a method for providing a car service according to an exemplary embodiment of the present disclosure will be described in detail with reference to FIG. 2. FIG. 2 is a flowchart illustrating the method for providing the car service according to an exemplary embodiment of the present disclosure. All of or a part of the steps method and/or operations of the foregoing embodiments can be realized using computer hardware and computer programs executed thereon.

Referring to FIG. 2, the car service providing apparatus 100 extracts the departure point (A), which indicates a present location, from the user terminal (S100) and receives the destination point (B) from the user terminal (S200).

The car service providing apparatus 100 calculates the fare when the car-hailing service is solely used from the departure point to the destination point (S250).

In the case that the calculated fare exceeds the predetermined reference value, the car service providing apparatus 100 determines whether the car-sharing station adjacent to the departure point exists (S300), and when the car-sharing station adjacent to the departure point exists, the car service providing apparatus 100 determines whether the car-sharing station adjacent to the destination point exists (S400). In this case, the car-sharing station adjacent to the departure point includes car-sharing stations existing within the walkable distance from the departure point, and the car-sharing station adjacent to the destination point includes car-sharing stations existing within the walkable distance from the destination point.

Figure 3:
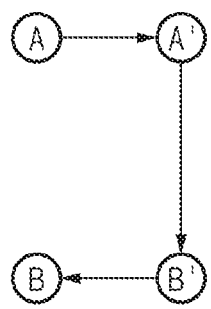
FIG. 3 is a view explaining a method for providing a car sharing service using only a car sharing route according to an exemplary embodiment of the present disclosure.

In the case that the car-sharing station adjacent to the destination point exists, the car service providing apparatus 100 determines that the car-sharing stations adjacent to the departure and destination points exist and generates routes that enable the user to get in a car providing the car-sharing service using the car-sharing station adjacent to the departure point and to get out of the car using the car-sharing station adjacent to the destination point to provide the routes to the user terminal and the driver terminal providing the car-sharing service (S500). FIG. 3 is a view explaining a method for providing a car service using only a car sharing route according to an exemplary embodiment of the present disclosure. Referring to FIG. 3, a car-sharing service sole route through which the user gets in the car in a car-sharing station (A') adjacent to the departure point (A) and gets out of the car in a car-sharing station (B') adjacent to the destination point (B) is provided.

When the car-sharing station adjacent to the departure point exists and the car-sharing station adjacent to the destination point does not exist, the car service providing apparatus 100 provides a sharing-hailing route service in which the user uses the car-sharing service using the car-sharing station adjacent to the departure point, gets out of the car in the car-sharing station existing within a route from the departure point to the destination point, and moves to the destination point using the car-hailing service (S600).

In the case that the car-sharing station adjacent to the departure point does not exist, the car service providing apparatus 100 determines whether the car-sharing station adjacent to the destination point exists (S700).

In the case that the car-sharing station adjacent to the destination point exists, the car service providing apparatus 100 provides a hailing-sharing route service that enables the user to get in the car providing the car-hailing service and located adjacent to the departure point and to get out of the car in the car-sharing station adjacent to the destination point to walk to the destination point (S800).

In the case that the car-sharing station adjacent to the destination point does not exist, i.e., in the case that the car-sharing stations adjacent to the departure and destination points do not exist, the car service providing apparatus 100 extracts the car-sharing stations between the departure point and the destination point to extract the car-sharing station adjacent to the departure point as the first waypoint and the car-sharing station adjacent to the destination point as the second waypoint and provides a hailing-sharing-hailing route service that enables the user to use the car-hailing service from the departure point to the first waypoint, to use the car-sharing service from the first waypoint to the second waypoint, and to use the car-hailing service from the second waypoint to the destination point (S900).

Figure 4:
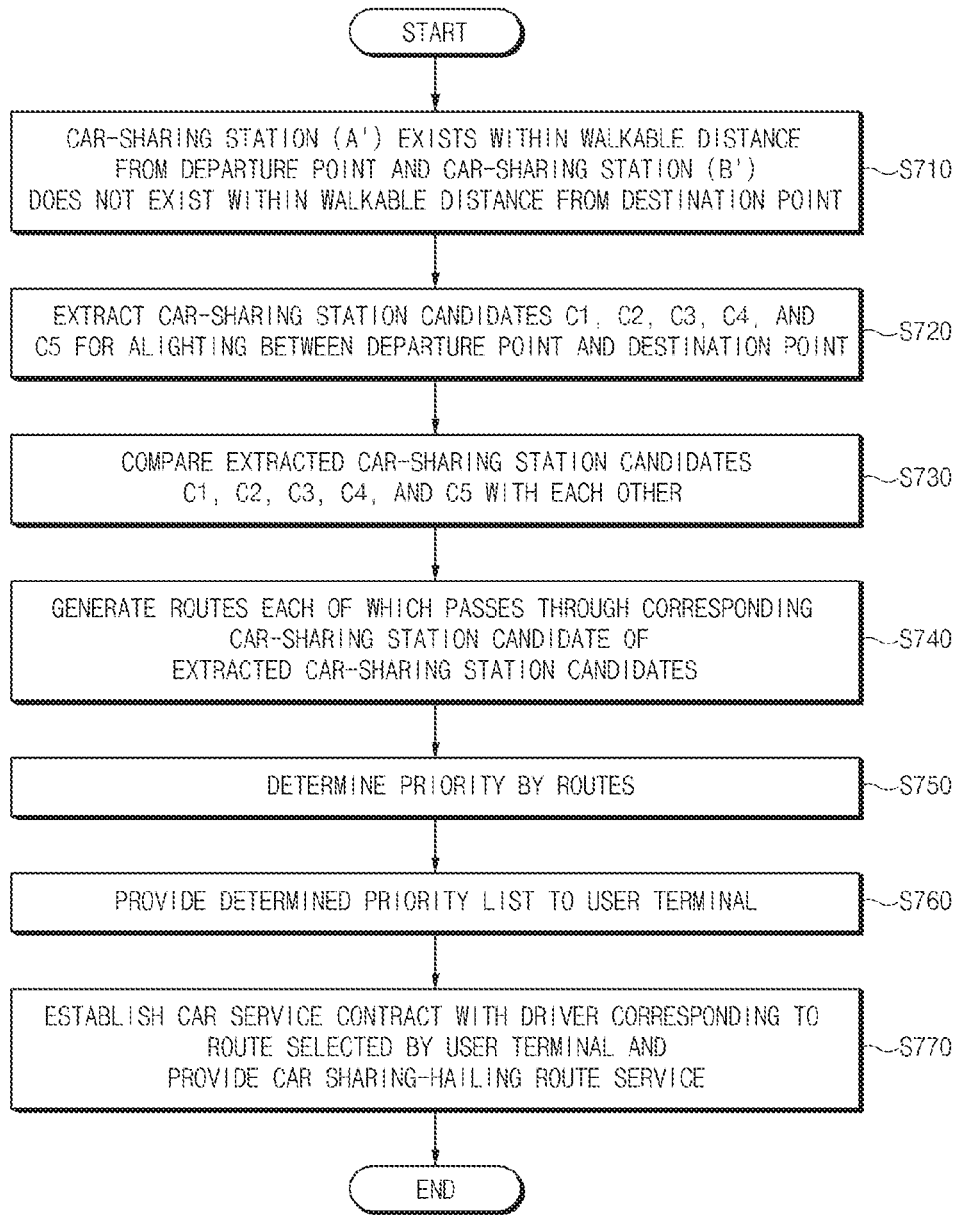
FIG. 4 is a flowchart illustrating a method for providing a car sharing service using a car sharing-hailing route according to an exemplary embodiment of the present disclosure.

Hereinafter, a method for providing a car service using a car sharing-hailing route according to an exemplary embodiment of the present disclosure will be described in detail with reference to FIGS. 4 and 5. FIG. 4 is a flowchart illustrating a method for providing a car service using a car sharing-hailing route according to an exemplary embodiment of the present disclosure, and FIG. 5 is a view explaining a method for providing a car service using a car sharing-hailing route according to an exemplary embodiment of the present disclosure.

Figure 5:
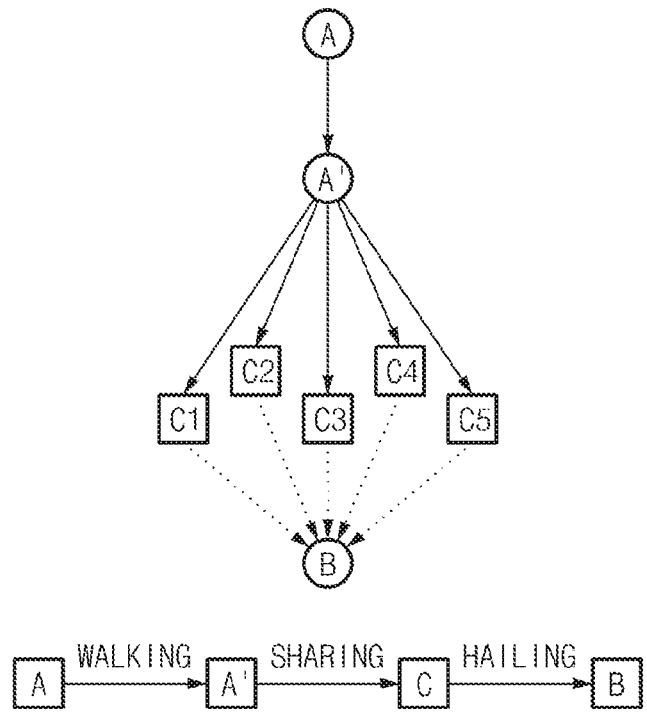
FIG. 5 is a view explaining a method for providing a car sharing service using a car sharing-hailing route according to an exemplary embodiment of the present disclosure.

Referring to FIGS. 4 and 5, in a case that the car-sharing station (A') exists within the walkable distance from the departure point and the car-sharing station (B') does not exist within the walkable distance from the destination point (S710), the car service providing apparatus 100 extracts car-sharing station candidates C1, C2, C3, C4, and C5, which enable the user to get out of the car, between the departure point and the destination point (S720).

Then, the car service providing apparatus 100 compares the car-sharing station candidates C1, C2, C3, C4, and C5 with each other using the number of cars providing the car-hailing service around each of the car-sharing station candidates C1, C2, C3, C4, and C5, a car-hailing service success probability of each of the car-sharing station candidates C1, C2, C3, C4, and C5, a state whether the traffic is congested around each of the car-sharing station candidates C1, C2, C3, C4, and C5, a state whether it is possible to return the car in each of the car-sharing station candidates C1, C2, C3, C4, and C5, a distance from each of the car-sharing station candidates C1, C2, C3, C4, and C5 to the destination point, a car-sharing contract time, or a distance from the departure point to each of the car-sharing station candidates C1, C2, C3, C4, and C5 (S730).

In this case, the car-sharing station candidates C1, C2, C3, C4, and C5 may be compared with each other to have high priority as the number of cars providing the car-hailing service around each of the car-sharing station candidates increases, as there is less traffic congestion, as the car is able to be returned, as the distance from the car-sharing station candidate to the destination point becomes short, as the car-sharing contract time matches, and as the distance from the departure point to each of the car-sharing station candidates becomes short.

Then, the car service providing apparatus 100 generates routes, each of which travels to the destination point from the departure point after passing through a corresponding car-sharing station of the car-sharing station candidates C1, C2, C3, C4, and C5 (S740).

Next, the car service providing apparatus 100 determines the priority by the generated routes (S750) and provides the user terminal with the determined priority list (S760). In this case, the priority may be determined using at least one of a fare on each route, a driving distance, an estimated driving time, an estimated waiting time, or the comparison information between the car-sharing station candidates.

Accordingly, the car service providing apparatus 100 establishes the car service contract with the driver corresponding to the route selected by the user terminal and provides the car sharing-hailing route service (S770).

That is, referring to FIG. 5, the car service providing apparatus 100 may provide the car sharing-hailing combination route that enables the user to move to the car-sharing station (A') within the walkable distance from the departure point (A), to get in the car providing the car-sharing service, to get out of the car in a corresponding candidate selected from the car-sharing station candidates C1, C2, C3, C4, and C5, and to reach the destination point using the car hailed by the car-hailing service.

TABLE 1

| Car-sharing station candidate | Hail success probability (%) | Fare (USD) | Priority |
|---|---|---|---|
| C1 | 90 | 80 | 2 |
| C2 | 76 | 30 | 1 |
| C3 | 53 | 110 | 4 |
| C4 | 41 | 50 | 3 |
| C5 | 16 | 30 | 5 |

As shown in Table 1, the car-sharing station candidate C1 has convenience in using of the car-hailing service (the hail success probability) of about 90%, and the fare is about 80 USD when the user reaches the destination point using the car-sharing station candidate C1. The car-sharing station candidate C2 has the hail success probability of about 76%, and the fare is about 30 USD when the user reaches the destination point using the car-sharing station candidate C2. The car-sharing station candidate C3 has the hail success probability of about 53%, and the fare is about 110 USD when the user reaches the destination point using the car-sharing station candidate C3. The car-sharing station candidate C4 has the hail success probability of about 41%, and the fare is about 50 USD when the user reaches the destination point using the car-sharing station candidate C4. The car-sharing station candidate C5 has the hail success probability of about 16%, and the fare is about 30 USD when the user reaches the destination point using the car-sharing station candidate C5. The priority may be determined by taking into account all the hail success probability and the fare. As an example, in a case that the user sets the fare as a top priority, the car-sharing station candidates C2 and C5, which have the fare of about 30 USD, may be determined as first and second priorities 1 and 2, respectively, and in a case that the user sets the hail success probability as the top priority, the car-sharing station candidate C1, which has highest hail success probability, may be determined as the first priority 1.

Figure 6:
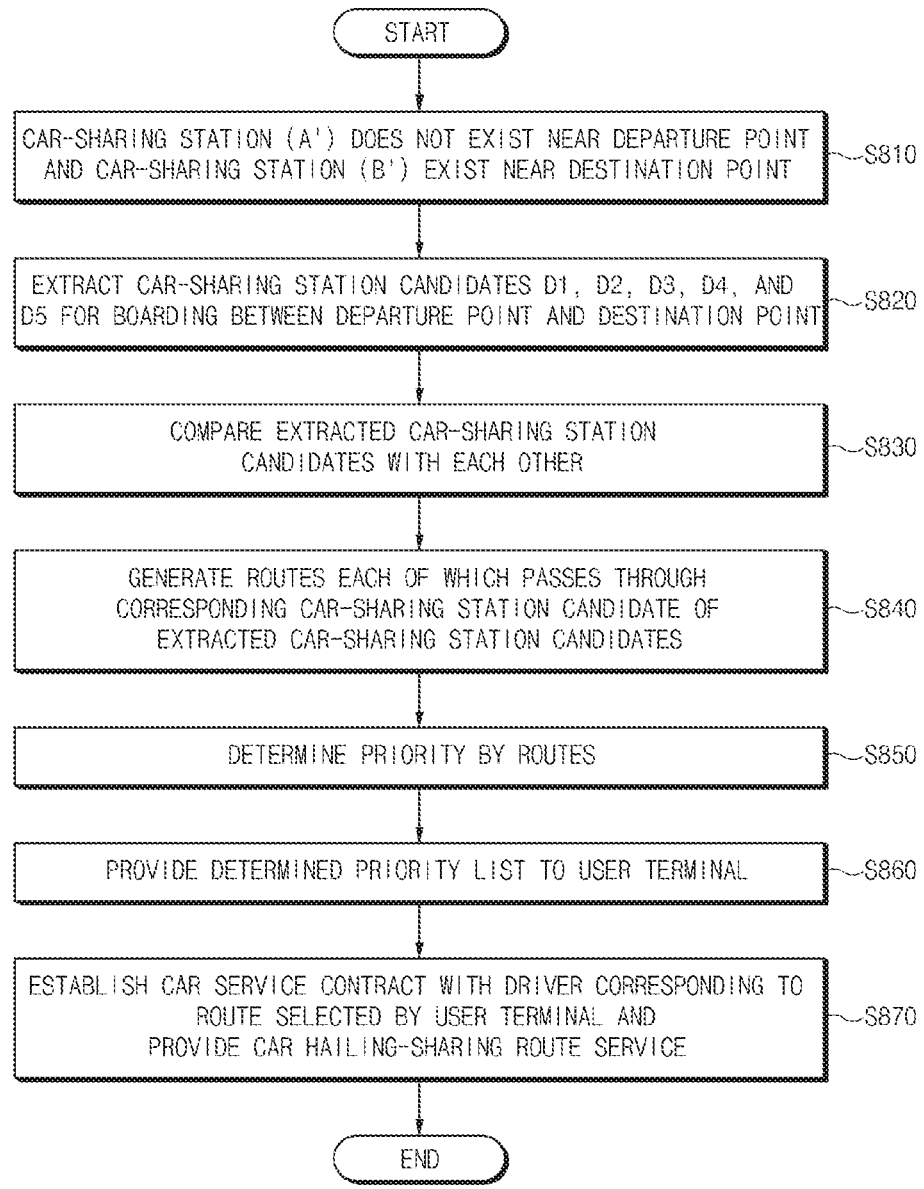
FIG. 6 is a flowchart illustrating a method for providing a car sharing service using a car hailing-sharing route according to an exemplary embodiment of the present disclosure.

Hereinafter, a method for providing a car service using a car hailing-sharing route according to an exemplary embodiment of the present disclosure will be described in detail with reference to FIGS. 6 and 7. FIG. 6 is a flowchart illustrating a method for providing a car service using a car hailing-sharing route according to an exemplary embodiment of the present disclosure, and FIG. 7 is a view explaining a method for providing a car service using a car hailing-sharing route according to an exemplary embodiment of the present disclosure.

Figure 7:
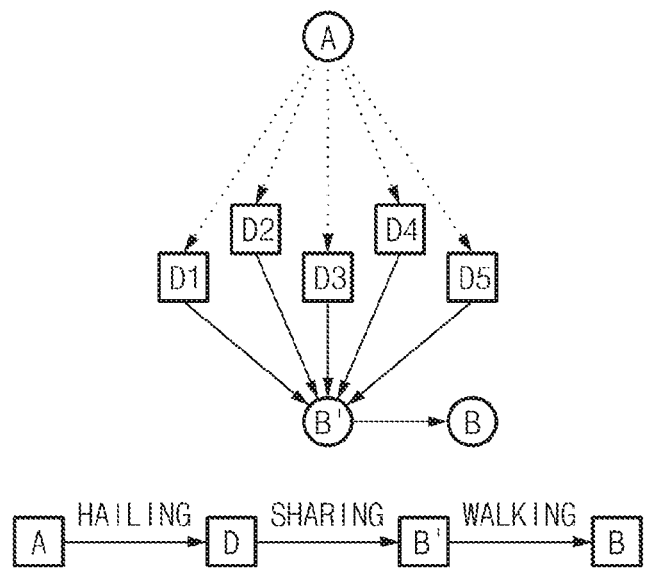
FIG. 7 is a view explaining a method for providing a car sharing service using a car hailing-sharing route according to an exemplary embodiment of the present disclosure.

Referring to FIGS. 6 and 7, in a case that the car-sharing station (A') does not exist within the walkable distance from the departure point and the car-sharing station (B') exists within the walkable distance from the destination point (S810), the car service providing apparatus 100 extracts car-sharing station candidates D1, D2, D3, D4, and D5, which enable the user to get in the car, between the departure point and the destination point (S820).

Then, the car service providing apparatus 100 compares the car-sharing station candidates D1, D2, D3, D4, and D5 with each other using a state whether the traffic is congested around each of the car-sharing station candidates D1, D2, D3, D4, and D5, a state whether it is possible to return the car in each of the car-sharing station candidates D1, D2, D3, D4, and D5, a distance from each of the car-sharing station candidates D1, D2, D3, D4, and D5 to the destination point, a car-sharing contract time of each of the car-sharing station candidates D1, D2, D3, D4, and D5, or a distance from the departure point to each of the car-sharing station candidates D1, D2, D3, D4, and D5 (S830). In this case, the car-sharing station candidates D1, D2, D3, D4, and D5 may be compared with each other to have high priority as the number of cars providing the car-hailing service around each of the car-sharing station candidates increases, as there is less traffic congestion, as the car is able to be returned, as the distance from the car-sharing station candidate to the destination point becomes short, as the car-sharing contract time matches, and as the distance from the departure point to each of the car-sharing station candidates becomes short.

Then, the car service providing apparatus 100 generates routes, each of which travels to the destination point from the departure point after passing through a corresponding car-sharing station of the car-sharing station candidates D1, D2, D3, D4, and D5 (S840).

Next, the car service providing apparatus 100 determines the priority by the generated routes (S850) and provides the user terminal with the determined priority list (S860). In this case, the priority may be determined using at least one of a fare on each route, a driving distance, an estimated driving time, an estimated waiting time, or the comparison information between the car-sharing station candidates.

Accordingly, the car service providing apparatus 100 establishes the car service contract with the driver corresponding to the route selected by the user terminal and provides the car hailing-sharing route service (S870).

That is, referring to FIG. 7, the car service providing apparatus 100 may provide the car hailing-sharing combination route that enables the user to get in the car hailed by using the car-hailing service in the departure point, to move to the one car-sharing station candidate selected from the car-sharing station candidates D1, D2, D3, D4, and D5, to get out of the car in a corresponding candidate, and to reach the destination point using the car-sharing service.

For instance, in a case that the departure point is Yangjae Station, the destination point is Hwaseong City, the car-sharing station exists in an AT center near Yangjae Station, and the car-sharing station does not exist within the walkable distance from Hwaseong City, the car-sharing stations located in a route from Yangjae Station to Hwaseong City are extracted. As an example, in a case that Suwon Station, Hwaseong City Hall, and Uiwang Station are extracted as the car-sharing stations located in the route from Yangjae Station to Hwaseong City, the priority may be determined by comparing various information, such as whether it is possible to reach from Yangjae Station to each of Suwon Station, Hwaseong City Hall, and Uiwang Station within the car-sharing contract time, whether the distance from each Suwon Station, Hwaseong City Hall, and Uiwang Station to Hwaseong City is short, whether plural car-hailing service providing cars exist around each of Suwon Station, Hwasung City Hall, and Uiwang Station, whether the traffic is congested, etc.

Then, the priority of the routes is determined by using an estimated fare, a driving distance, an estimated driving time, and comparison information of the candidates with respect to each of a route 1 from Yangjae Station (AT center) to Hwaseong City via Suwon Station, a route 2 from Yangjae Station (AT center) to Hwaseong City via Hwaseong City Hall, and a route 3 from Yangjae Station (AT center) to Hwaseong City via Uiwang Station.

That is, in a case that the waiting time for the car-hailing service is short and the driving distance and the driving time increase since the route 1 includes lots of downtown areas in the route 1 via Suwon Station, and in a case that there is an additional fare for the car-sharing service, the waiting time for the car-hailing service is long, and the driving distance and the driving time decrease since the route 2 includes lots of highways in the route 2 via Hwaseong City, the route 2 via Hwaseong City may have the higher priority than the route 1 via Suwon Station.

Figure 8:
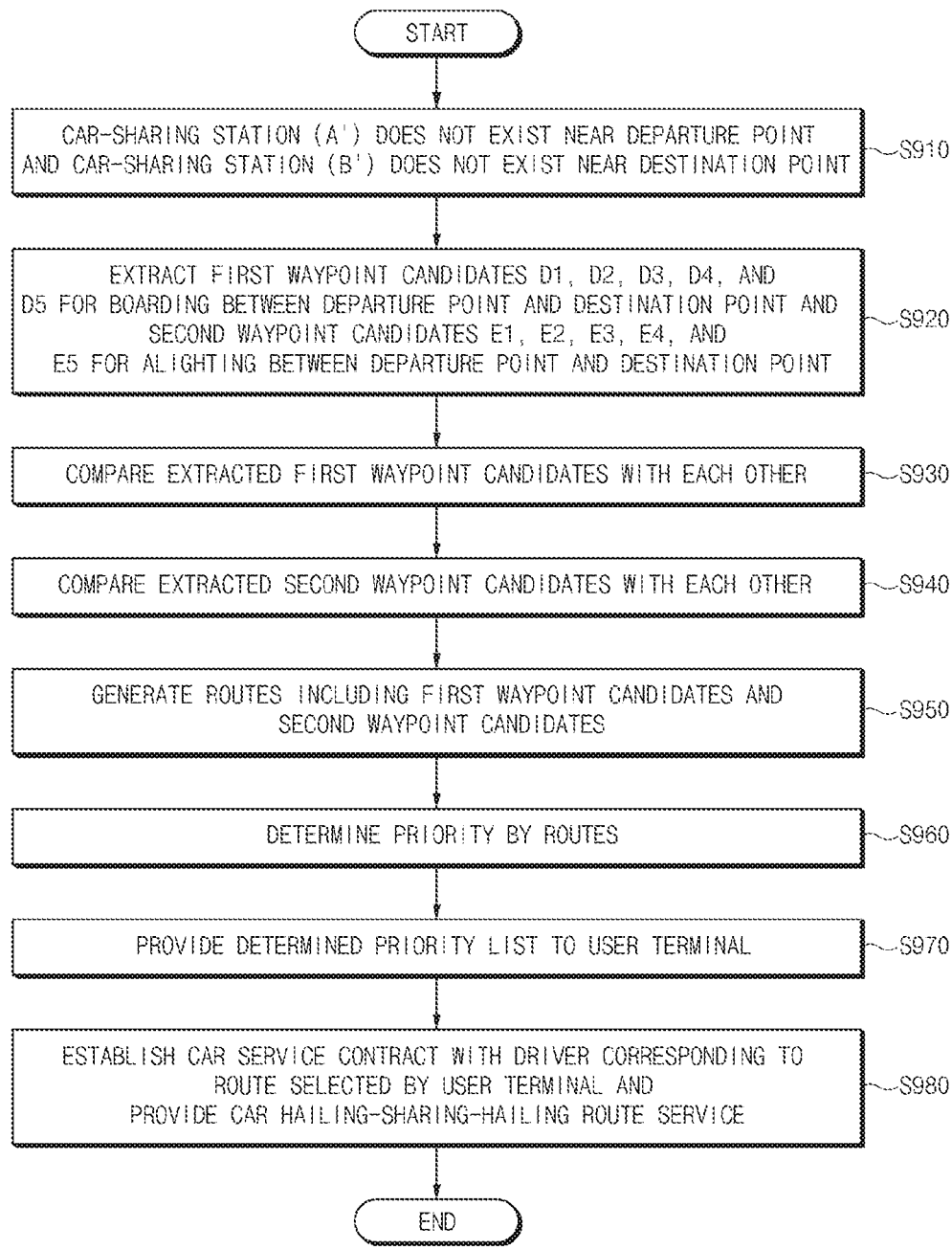
FIG. 8 is a flowchart illustrating a method for providing a car sharing service using a car hailing-sharing-hailing route according to an exemplary embodiment of the present disclosure.

Hereinafter, a method for providing a car service using a car hailing-sharing-hailing route according to an exemplary embodiment of the present disclosure will be described in detail with reference to FIGS. 8 and 9. FIG. 8 is a flowchart illustrating a method for providing a car service using a car hailing-sharing-hailing route according to an exemplary embodiment of the present disclosure, and FIG. 9 is a view explaining a method for providing a car service using a car hailing-sharing-hailing route according to an exemplary embodiment of the present disclosure.

Figure 9:
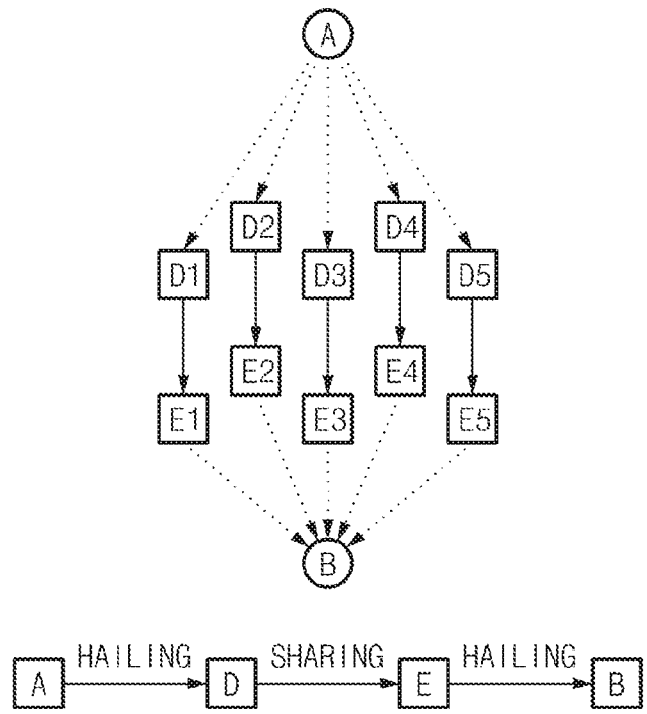
FIG. 9 is a view explaining a method for providing a car sharing service using a car hailing-sharing-hailing route according to an exemplary embodiment of the present disclosure.

Referring to FIGS. 8 and 9, in a case that the car-sharing station (A') does not exist within the walkable distance from the departure point and the car-sharing station (B') does not exist within the walkable distance from the destination point (S910), the car service providing apparatus 100 extracts first waypoint candidates D1, D2, D3, D4, and D5, which enable the user to get in the car, between the departure point and the destination point and second waypoint candidates E1, E2, E3, E4, and E5, which enable the user to get out of the car, between the departure point and the destination point (S920).

The car service providing apparatus 100 compares the first waypoint candidates D1, D2, D3, D4, and D5 with each other using a state whether the traffic is congested around each of the first waypoint candidates D1, D2, D3, D4, and D5, a state whether it is possible to return the car in each of the first waypoint candidates D1, D2, D3, D4, and D5, a distance from each of the first waypoint candidates D1, D2, D3, D4, and D5, which are the car-sharing stations, to the destination point, a car-sharing contract time of each of the first waypoint candidates D1, D2, D3, D4, and D5, and a distance from the departure point to each of the first waypoint candidates D1, D2, D3, D4, and D5 (S930).

In addition, the car service providing apparatus 100 compares the second waypoint candidates E1, E2, E3, E4, and E5 with each other using the number of cars providing the car-hailing service around each of the second waypoint candidates E1, E2, E3, E4, and E5, a car-hailing service success probability of each of the second waypoint candidates E1, E2, E3, E4, and E5, a state whether the traffic is congested around each of the second waypoint candidates E1, E2, E3, E4, and E5, a state whether it is possible to return the car in each of the second waypoint candidates E1, E2, E3, E4, and E5, a distance from each of the second waypoint candidates E1, E2, E3, E4, and E5, which are the car-sharing stations, to the destination point, a car-sharing contract time of each of the second waypoint candidates E1, E2, E3, E4, and E5, and a distance from the departure point to each of the second waypoint candidates E1, E2, E3, E4, and E5, which are the car-sharing stations (S940).

Then, the car service providing apparatus 100 generates routes, each of which travels to the destination point from the departure point after passing through a corresponding first waypoint candidate of the first waypoint candidates D1, D2, D3, D4, and D5 and a corresponding second waypoint candidate of the second waypoint candidates E1, E2, E3, E4, and E5 (S950).

Next, the car service providing apparatus 100 determines the priority by the generated routes (S960) and provides the user terminal with the determined priority list (S970). In this case, the priority may be determined using at least one of a fare on each route, a driving distance, an estimated driving time, an estimated waiting time, or the comparison information between the car-sharing station candidates.

Accordingly, the car service providing apparatus 100 establishes the car service contract with the driver corresponding to the route selected by the user terminal and provides the car hailing-sharing-hailing route service (S980).

That is, referring to FIG. 9, the car service providing apparatus 100 may provide the car hailing-sharing-hailing combination route that enables the user to get in the car hailed by the car-hailing service in the departure point (A), to move to one first waypoint candidate selected from the first waypoint candidates D1, D2, D3, D4, and D5, to get out of the car in the selected first waypoint candidate, to move to one second waypoint candidate selected from the second waypoint candidates E1, E2, E3, E4, and E5 using the car-sharing service in the selected first waypoint candidate selected from the first waypoint candidates D1, D2, D3, D4, and D5, to get out of the car in the selected second waypoint candidate, and to reach the destination point from the selected second waypoint candidate using the car hailed by the car-hailing service.

As an example, in a case that the departure point is Ganghwamun, the destination point is Hwaseong City, the car-sharing station does not exist within the walkable distance from Ganghwamun, and the car-sharing station does not exist within the walkable distance from Hwaseong City, the car-sharing providing apparatus 100 searches for whether the car-sharing stations exist in a route from Ganghwamun to Hwaseong City and extracts a car-sharing station (the first waypoint candidate) nearest to Ganghwamun and a car-sharing station (the second waypoint candidate) nearest to Hwaseong City.

As an example, in a case that Seoul City Hall, Myeongdong Station, Seoul Station, Suwon Station, Hwaseong City Hall, and Uiwang Station are extracted as the car-sharing stations located in the route from Ganghwamun to Hwaseong City, Seoul City Hall, Myeongdong Station, and Seoul Station may be selected as the first waypoint candidate near to the departure point, and Suwon Station, Hwaseong City Hall, and Uiwang Station may be selected as the second waypoint candidate near to the destination point.

The priority may be determined by comparing various information, such as whether there are plural cars providing the car-hailing service around the first and second waypoint candidates, whether the car-hailing success probability is high, whether there are lots of the car-hailing service records, whether there is traffic congestion, whether the fare of the car-hailing service is in a minimum section, whether the user reaches the first waypoint candidate or the second waypoint candidate within the car-sharing contract time, or the like and by taking into account the compared result, the fare, the distance, and the driving time with respect to each of the routes via the corresponding waypoint candidate of the waypoint candidates.

As an example, when assuming that the car-hailing service fare with respect to Seoul City Hall and Hwaseong City Hall is below a reference value, the car-hailing service fare with respect to Seoul Station and Suwon station exceeds the reference value, the plural cars providing the car-hailing service exist, and there is traffic congestion, the priority of the first waypoint candidates is determined in order of Myeongdong Station-Seoul Station-Seoul City Hall, and the priority of the second waypoint candidates is determined in order of Uiwang Station-Suwon Station-Hwaseong City Hall.

Then, the car service providing apparatus 100 generates routes, each of which travels to the destination point from the departure point after passing through the corresponding waypoint candidate of the waypoint candidates, and reviews the priority of the routes by taking into account the estimated fare by each route, the driving distance, the estimated driving time, and the comparison result of each waypoint candidate.

For instance, in a case that the waiting time for the car-hailing service is short and the driving distance and the driving time increase since the route via Seoul Station and the route via Suwon Station include lots of downtown areas in the route via Seoul Station and the route via Suwon Station, and in a case that there is an additional fare for the car-sharing service, the waiting time for the car-hailing service is long, and the driving distance and the driving time decrease since the route via Myeongdong Station and the route via Hwaseong city include lots of highways in the route via Myeongdong Station and the route via Hwaseong City, a route passing via Ganghwamun→Myeongdong Station→Uiwang Station→Hwaseong City becomes a first priority, and a route passing via Ganghwamun→Myeongdong Station→Hwaseong City Hall→Hwaseong City becomes a second priority, and a route passing via Ganghwamun→Seoul Station→Uiwang Station→Hwaseong City becomes a third priority.

When the routes depending on the priority are provided to the user terminal, the route desired by the user may be selected using the user terminal, and thus the car service contract is established.

In addition, as an example, in a case that a user A makes a contract to share (rent) the car A for 5 hours, rides in the car A to move to Hanam from Seoul, parks the car A in a parking lot near Hanam, returns to Seoul using the car A parked in the parking lot near Hanam after two hours elapses, and returns the car A, the cost for using the car A for 5 hours is 100 USD. In a case that a user B wants to use the car A only for 2 hours and the user B uses the car A, which is left in the parking lot near Hanam by the user A, for 2 hours and parks the car A in the parking lot near Hanam again, the user B pays 40 USD, and the user A pays only 60 USD.

As described above, in the case that it is difficult to solely use the car-hailing service (since the fare is high) or the car-sharing station is too far to walk, the present disclosure provides the route obtained by combining the car-hailing service and the car-sharing service, and thus the convenience of the user and the driver may be improved.

Figure 10:
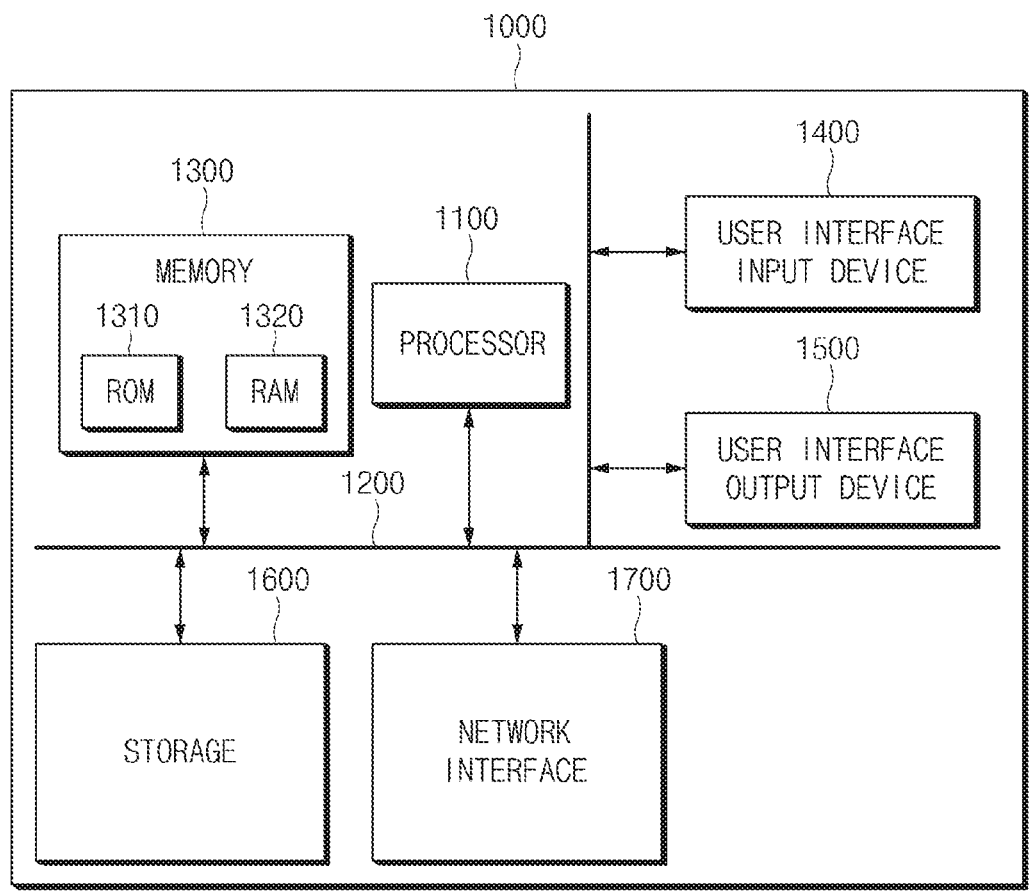
FIG. 10 is a block diagram illustrating a configuration of a computing system to which a technique for providing a car sharing service is applied according to an exemplary embodiment of the present disclosure.

FIG. 10 is a block diagram illustrating a configuration of a computing system to which a technique for providing a car service is applied according to an exemplary embodiment of the present disclosure. Referring to FIG. 10, the computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component of the user terminal.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. An apparatus for providing a car sharing service, comprising:
   a processor configured to:
   extract at least one car-sharing station candidate between a departure point and a destination point,
   generate at least one route that combines and provides a car-hailing service and a car-sharing service from the departure point to the destination point via the at least one car-sharing station candidate, the at least one route including a plurality of sections, among which at least one section provides the car-hailing service and another at least one section, different from the at least one section providing the car-hailing service, provides the car-sharing service,
   determine a priority of each of the at least one route using a car-hailing success probability, wherein the car-hailing success probability refers to a success rate of a user for receiving a car-hailing service at the at least one car-sharing station candidate, and
   provide the determined priority to a user terminal, and allow the user terminal to display the determined priority and to select one from among the at least one route based on the displayed priority; and
   a storage configured to store the generated at least one route, information about a car-sharing station, information about a fare on each route, and information about a location of the user terminal,
   wherein the at least one car-sharing station candidate is extracted among predetermined car-sharing stations by a service provider.

2. The apparatus of claim 1, wherein the processor is configured to:
   extract car-sharing station candidates for providing the car-sharing service to a portion of the at least one route between the departure point and the destination point,
   compare the car-sharing station candidates with each other using at least one of a number of cars providing the car-hailing service within a distance from the respective car-sharing station candidates, the car-hailing success probability, a state whether a traffic is congested around the respective car-sharing station candidates, the state whether it is possible to return the car in the respective car-sharing station candidates, the distance from the respective car-sharing station candidates to the destination point, or the distance from the car-sharing station, which exists within the certain distance from the departure point, to the respective car-sharing station candidates, so as to select at least one car-sharing station candidate among the car-sharing station candidates,
   generate at least one route among a car-sharing service sole route, a car-hailing service sole route, and a combination route of the car-sharing service and the car-hailing service from the departure point to the destination point via the selected at least one car-sharing station candidate, and
   determine the priority using at least one of the fare on each route, a driving distance, an estimated driving time, the estimated waiting time, or information about comparison between the car-sharing station candidates.

3. The apparatus of claim 1, wherein the processor is further configured to combine and provide the car-hailing service and the car-sharing service when the car-hailing service is solely used from the departure point to the destination point and the fare is equal to or greater than a reference value.

4. The apparatus of claim 3, wherein the processor is further configured to determine whether a car-sharing station exists within a first walkable distance from the departure point and whether a car-sharing station exists within a second walkable distance from the destination point.

5. The apparatus of claim 4, wherein, in a case that the car-sharing station exists within the first walkable distance from the departure point and the car-sharing station does not exist within the second walkable distance from the destination point, the processor provides the car-sharing service from the car-sharing station existing within the first walkable distance from the departure point to a car-sharing station which exists near the destination point but not within the second walkable distance from the destination point, and provides the car-hailing service from the car-sharing station which is not within the second walkable distance from the destination point to the destination point.

6. The apparatus of claim 4, wherein, in a case that the car-sharing station does not exist within the first walkable distance from the departure point and the car-sharing station exists within the second walkable distance from the destination point, the processor determines whether a car-sharing station for alighting exists in the route between the departure point and the destination point, and
   wherein, in a case that the car-sharing station for alighting exists, the processor provides the car-hailing service from the departure point to the car-sharing station for alighting and provides the car-sharing service from the car-sharing station for alighting to the car-sharing station existing within the second walkable distance from the destination point.

7. The apparatus of claim 6, wherein the car-sharing station for alighting in the route between the departure point and the destination point includes:
   a car-sharing station which is not within the first walkable distance from the departure point but within a reference travel distance by car; and
   a car-sharing station which is not within the second walkable distance from the destination point but within the reference travel distance by car.

8. The apparatus of claim 4, wherein, in a case that the car-sharing station does not exist within the first walkable distance from the departure point and the car-sharing station does not exist within the second walkable distance from the destination point, the processor:
   extracts at least one car-sharing station near the departure point in the route between the departure point and the destination point and at least one car-sharing station near the destination point in the route between the departure point and the destination point;
   provides the car-hailing service from the departure point to at least one car-sharing station near the departure point;
   provides the car-sharing service from at least one car-sharing station near the departure point to at least one car-sharing station near the destination point; and
   provides the car-hailing service from at least one car-sharing station near the destination point to the destination point.

9. The apparatus of claim 1, the processor is further configured to:
   extract the departure point corresponding to a location of the user terminal;

extract a location of the car providing the car-hailing service around the departure point;

set the fare on each route; and perform an authentication operation when the user terminal logs in for requesting the car sharing service.

10. The apparatus of claim 1, further comprising a communication device, when at least one or more route, which is generated using a number of at least one car-sharing station candidate, traveling from the departure point to the destination point via at least one car-sharing station candidate is selected by the user terminal, configured to perform a communication between a driver terminal providing the car-sharing service of the selected route, a driver terminal providing the car-hailing service, and the user terminal requesting the car sharing service.

11. An apparatus for providing a car sharing service, comprising a processor configured to:

extract one or more car-sharing station candidates in a route between a departure point and a destination point when a user uses a car-sharing service in the departure point, compare the one or more car-sharing station candidates with each other using a car-hailing success probability, wherein the car-hailing success probability refers to a success rate of a user for receiving a car-hailing service at the one or more car-sharing station candidates, generate at least one first route providing the car-sharing service from the departure point to the one or more car-sharing station candidates and at least one second route providing the car-hailing service from each of the one or more car-sharing station candidates to the destination point, determine a priority of each of at least one combination route combining the at least one first route and the at least one second route, using information about comparison between the one or more car-sharing station candidates, and provide the determined priority to a user terminal, and allow the user terminal to display the determined priority and to select one from among the at least one combination route based on the displayed priority, wherein the one or more car-sharing station candidates are extracted among predetermined car-sharing stations by a service provider.

12. The apparatus of claim 11, wherein the processor is further configured to:

determine whether the fare exceeds a reference value when the car-hailing service is solely used, and determine whether the car-hailing service is to be combined with the car-sharing service depending on a determination result of whether the fare exceeds the reference value.

13. The apparatus of claim 12, wherein, in a case that the processor determines that the fare exceeds the reference value when the car-hailing service is solely used, the processor extracts the one or more car-sharing station candidates.

14. The apparatus of claim 12, wherein the processor is further configured to determine whether a car-sharing station exists within a first walkable distance from the departure point and whether a car-sharing station exists within a second walkable distance from the destination point.

15. The apparatus of claim 14, wherein, in a case that the processor determines that the car-sharing station exists within the first walkable distance from the departure point and the car-sharing station does not exist within the second walkable distance from the destination point, the processor determines whether a car-sharing station exists near the destination point but not within the second walkable distance from the destination point, generates a route for providing the car-sharing service from the car-sharing station existing within the first walkable distance from the departure point to the car-sharing station near the destination point, and generates a route for providing the car-hailing service from the car-sharing station which is not within the second walkable distance from the destination point to the destination point.

16. An apparatus for providing a car sharing service, comprising a processor configured to:

extract one or more car-sharing station candidates in a route between a departure point and a destination point when a user departs from the departure point using a car-sharing service;

compare the one or more car-sharing station candidates with each other using a car-hailing success probability, wherein the car-hailing success probability refers to a success rate of a user for receiving a car-hailing service at the one or more car-sharing station candidates;

generate at least one first route for providing the car-hailing service from the departure point to the one or more car-sharing station candidates and at least one second route for providing the car-sharing service from the one or more car-sharing station candidates to the destination point; and determine a priority of each of at least one combination route combining the at least one first route and the at least one second route, using information about comparison between the one or more car-sharing station candidates, and provide the determined priority to a user terminal, and allow the user terminal to display the determined priority and to select one from among the at least one combination route based on the displayed priority, wherein the one or more car-sharing station candidates are extracted among predetermined car-sharing stations by a service provider, and wherein the car-sharing service is different from a public transportation service.

17. The apparatus of claim 16, wherein the processor is further configured to:

determine whether the fare exceeds a reference value when the car-hailing service is solely used; and determine whether the car-hailing service is to be combined with the car-sharing service depending on a determination result of whether the fare exceeds the reference value.

18. The apparatus of claim 17, wherein, in a case that the processor determines that the fare exceeds the reference value when the car-hailing service is solely used, the processor extracts the one or more car-sharing station candidates.

19. The apparatus of claim 17, wherein the processor is further configured to determine whether a car-sharing station exists within a first walkable distance from the departure point and whether a car-sharing station exists within a second walkable distance from the destination point.

20. The apparatus of claim 19, wherein, in a case that the processor determines that the car-sharing station does not exist within the first walkable distance from the departure point and the car-sharing station exists within the second walkable distance from the destination point, the processor determines whether a car-sharing station candidate among the one or more car-sharing station candidates for boarding exists between the departure point and the destination point, and when the car-sharing station candidate near the departure point exists between the departure point and the destination point, the processor generates a route for providing the car-hailing service from the departure point to the car-sharing station candidate near the departure point and generates a route for providing the car-sharing service from the car-sharing station candidate near the departure point to the car-sharing station within the second walkable distance from the destination point.

\* \* \* \* \*